(12) United States Patent
Liu et al.

(10) Patent No.: US 9,508,087 B1
(45) Date of Patent: Nov. 29, 2016

(54) IDENTIFYING SIMILAR DISPLAY ITEMS FOR POTENTIAL PLACEMENT OF CONTENT ITEMS THEREIN

(71) Applicant: Google Inc., Mountain View, CA (US)

(72) Inventors: Zhenyu Liu, San Jose, CA (US); Ping Wu, Saratoga, CA (US)

(73) Assignee: Google Inc., Mountain View, CA (US)

( * ) Notice: Subject to any disclaimer, the term of this patent is extended or adjusted under 35 U.S.C. 154(b) by 546 days.

(21) Appl. No.: 13/796,806

(22) Filed: Mar. 12, 2013

(51) Int. Cl.
*G06Q 30/00* (2012.01)
*G06Q 30/02* (2012.01)
*G06F 3/0482* (2013.01)

(52) U.S. Cl.
CPC ......... *G06Q 30/0251* (2013.01); *G06F 3/0482* (2013.01)

(58) Field of Classification Search
CPC ................................................ G06Q 30/0251
See application file for complete search history.

(56) References Cited

U.S. PATENT DOCUMENTS

| | | | |
|---|---|---|---|
| 6,978,263 B2 * | 12/2005 | Soulanille | |
| 7,284,007 B1 * | 10/2007 | Francicus de Heer et al. | |
| 7,295,995 B1 * | 11/2007 | York et al. | 705/26.8 |
| 7,752,073 B2 | 7/2010 | Barry et al. | |
| 2006/0242013 A1 | 10/2006 | Agarwal et al. | |
| 2009/0300031 A1 | 12/2009 | Lejano et al. | |

OTHER PUBLICATIONS

EyeCue Digital; "Categorical Targeting"; http://www.eyecuedigital.com/media_kits/EyeCue_Digital_Categorical_Targeting.pdf; not dated; 1 page; located via Google.
JAWs; "Online Advertising—Why You Should"; Eclectic Marketing; http://eclectic-marketing.blogspot.com/2006_03_01_archive.html; Mar. 29, 2006; 2 pages; located via Google.

* cited by examiner

*Primary Examiner* — Bennett Sigmond
*Assistant Examiner* — Scott C Anderson
(74) *Attorney, Agent, or Firm* — Foley & Lardner LLP; John D. Lanza (57) ABSTRACT

Apparatus and method for identifying similar publisher display items for potential placement of content items therein. In accordance with some embodiments, a population of publisher display items is provided each adapted to be respectively displayed on a graphical user interface (GUI) of a network accessible device. The display items are sorted into sets of similar display items responsive to user interactions with said display items so that, for each display item in the population, a number of similar display items is associated therewith. A content item is received for potential display in conjunction with the display of a first selected display item in the population of display items. The content item is thereafter displayed in one of the other display items of the set of similar display items associated with the first selected display item.

19 Claims, 5 Drawing Sheets

IDENTIFYING SIMILAR DISPLAY ITEMS FOR POTENTIAL PLACEMENT OF CONTENT ITEMS THEREIN

BACKGROUND

Content providers (publishers) generally provide content for display on various network accessible devices (e.g., smart phones, tablets, laptops, e-readers, etc.). The content (publisher display items) can take a variety of forms, such as web pages, mobile applications (apps), audio works (e.g., mp3 files), video works, textual works (e.g., e-books), etc.

The publisher display items can be arranged to request and display one or more content items (such as advertisements) in specially configured slots. The content items may establish links to landing pages owned by third parties. The display of content items can provide a number of benefits to the publisher, such as revenue opportunities when the user of the device views and/or selects (clicks) a content item.

SUMMARY

Various embodiments disclosed herein are generally directed to an apparatus and method for identifying similar publisher display items for potential placement of content items therein.

In accordance with some embodiments, a computer-implemented method generally comprises identifying a population of publisher display items each adapted to be respectively displayed on a graphical user interface (GUI) of a network accessible device. The display items are sorted into sets of similar display items responsive to user interactions with said display items so that, for each display item in the population, a number of similar display items is associated therewith. A content item is received for potential display in conjunction with the display of a first selected display item in the population of display items. The content item is thereafter displayed in one of the other display items of the set of similar display items associated with the first selected display item.

In related embodiments, an apparatus generally comprises a memory which stores a population of publisher display items each adapted to be respectively displayed on a graphical user interface (GUI) of a network accessible device. An analysis engine is adapted to calculate a similarity measure for each of the display items based on user interactions with the display items and to sort the display items into sets of similar display items responsive to said similarity measures so that, for each display item in the population, a number of similar display items is associated therewith with shared usage characteristics. A content item selection engine identifies a contextual relation between a first display item in said population and a content item adapted for potential display in conjunction with the first display item, and to display the number of most similar display items associated with the first display item for potential placement of the content item.

In further related embodiments, an apparatus comprises an advertisement (ad) server having a controller and associated memory. The memory stores a program routine which configures the controller to, for each of a population of different types of publisher display items adapted for display on a network accessible device, to identify a set of K most similar display items in the population responsive to usage characteristics associated with user interaction with said display items, The routine further configures the controller, responsive to a contextual match between a selected advertisement (ad) and a first display item, to promote for placement the selected ad in each of the K most similar display items associated with the first display item.

These and other features and advantages which may characterize various embodiments can be understood in view of the following detailed discussion and the accompanying drawings.

DETAILED DESCRIPTION

The present disclosure generally relates to the identification of different types of publisher display items that have similar usage characteristics to promote the placement of content items therewith.

When a user of a network accessible device requests information from a publisher, a publisher display item can be transferred to the device for presentation via a graphical user interface (GUI) of the device. Publisher display items may take a variety of forms, such as but not limited to a web page, a mobile app, an e-reader book, an email service, a search engine, a game, an audio work, a video work, etc.

A publisher display item may include content supplied by the publisher as well as one or more slots to accommodate the insertion of content item(s) from third parties. The content items may be selected from a population of available content items from various content item providers. The content items can take a variety of forms, such as advertisements, communications, public service announcements, invitations to participate in a survey, petition, or some other activity, etc.

In some cases, the content items can include a creative portion and an interactive portion. The creative portion may provide textual, audio, image and/or video information to the user. The interactive portion, when selected ("clicked") by the user, connects the device to a linked web page or other location ("landing page") associated with the creative portion.

In an effort to improve user response to content items, content item providers often endeavor to select publisher display items that are appropriate outlets for their content items. An advertiser for a particular product or service, for example, may wish to have its content items displayed on publisher display items that covers topics relevant to the product/service offered by the advertiser.

While operable, one limitation with this approach is the inability to optimally select publisher display items that are likely to result in a favorable response to the content items of the advertiser. The advertiser may manually identify certain publisher display items (e.g., certain selected web sites) on which its content items may be potentially placed, or an automated system may be used that examines the contextual relationship between the content item and the display items to arrive at suggested placements.

This approach fails to take into account the possibility that other publisher display items may be available for which the advertiser might have success in displaying its content items, particularly other types of display items (e.g., downloaded mp3 files, e-reader books, etc.) that are not necessarily related, from a contextual standpoint, to the suggested display item(s).

Accordingly, various embodiments of the present disclosure generally operate to analyze and group together display items having similar usage characteristics. As explained below, a population of different types (classes) of publisher display items are evaluated to arrive at a set of K most similar display items for each available display item in the population. Thereafter, in response to the identification of a selected display item for the potential placement of a selected content item, the K most similar display items may also presented for potential placement of the content item.

In this way, correlations across different types of display items can be detected and used to improve user response to content items.

Figure 1:
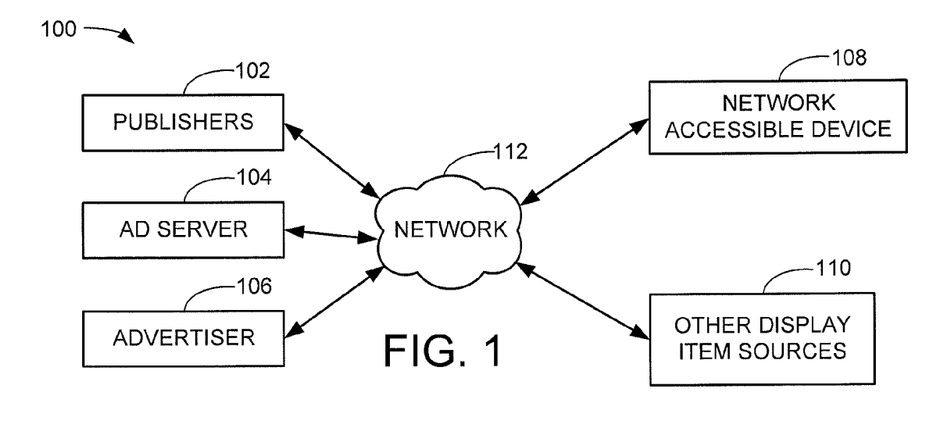
FIG. 1 provides a functional block representation of a network-based system in accordance with various embodiments.

These and other features and benefits of the present disclosure can be understood beginning with a review of FIG. 1, which depicts a network-based data transfer system 100 constructed and operated in accordance with various embodiments.

For purposes of providing a concrete example, the content items serviced by the system 100 will be contemplated as comprising advertisements (ads) which are displayed in various ad slots in different types of publisher display items. It will be appreciated that this is merely for purposes of illustration and is not limiting.

The system 100 incorporates a number of active elements including publisher servers 102, an advertisement (ad) server 104, an advertiser (content item owner) server 106, and at least one user network accessible device 108. The publisher servers 102 are contemplated as providing publisher web pages for display on the device 108. The system 100 further includes a number of additional sources 110 of publisher display items that can be displayed on the device 108, such as web pages, A/V works, mobile apps, e-books, etc.

The various servers and devices in FIG. 1 communicate via a network fabric 112, which may constitute one or more communication networks such as the Internet, a WAN (wide area network), a LAN (local area network), a broadband wireless network, etc.

The publishers 102 represent web page hosting servers or similar systems adapted to transfer web pages from websites to the device 108. The ad server 104 services ad requests to display ads in conjunction with the web pages. The advertiser server 106 can be associated with a source or owner of the goods or services associated with the ads supplied by the ad server.

The network accessible device 108 can take a variety of forms, such as a desktop computer, a laptop computer, a smart phone, a tablet, a gaming console, a television, or other similar device adapted to interact with the publisher 102, ad server 104, advertiser 106 and other sources 110. It will be appreciated that other elements may be incorporated into the system 100 as desired.

Figure 2:
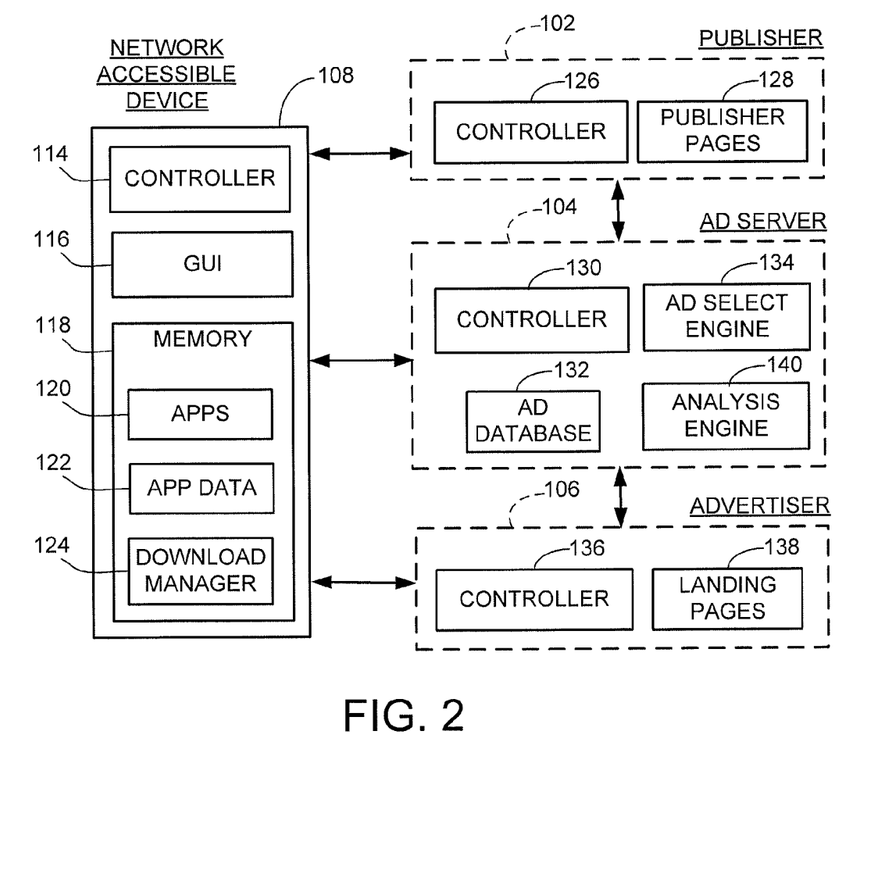
FIG. 2 provides another functional block representation of the network-based system in accordance with various embodiments.

FIG. 2 shows aspects of the system 100 of FIG. 1 in accordance with some embodiments. The network accessible device 108 from FIG. 1 will be contemplated to be a smart phone in FIG. 2, although this is merely for purposes of providing a concrete example and is not limiting.

The device 108 includes a controller 114, a graphical user interface (GUI) 116 and memory 118. The controller 114 may be a programmable processor that uses associated operating system programming and application software (e.g., a web browser) in the memory to interact with the network 112.

The GUI 116 may include a display monitor, keyboard, mouse, speakers, headphones, a touch screen, etc. The memory 118 may represent a hierarchical memory structure made up of various memory devices within the user device 108, including such elements as a non-volatile main memory (e.g., disc memory, solid-state drive, etc.), data transfer buffer, local processor (L1-L3) cache, etc.

The memory 118 stores various operational modules including applications (apps) 120 and application (app) data 122. A download manager 124 operates to control communications and data transfers across the network 112.

A selected publisher server 102 may include a controller 126 and a memory which stores a number of available publisher web pages 128. The web pages are transferred responsive to requests from the device 108.

The ad server 104 includes a controller 130, an ad database 132 in associated memory and an ad selection engine 134. The ad selection engine 134 may be realized as a processor routine stored in the memory and executed by the controller 130, or may be a separate hardware or software module (including a remote module). The ad selection engine generally operates to transfer one or more ads from the database 132 for display on the device 108 in response to ad requests from web pages and other display items loaded onto the device.

The advertiser server 106 is a type of publisher server for an entity associated with at least one of the content items (ads) in the ad server. The advertiser server 106 includes a controller 136 and a set of landing pages 138 in associated memory.

Figure 3:
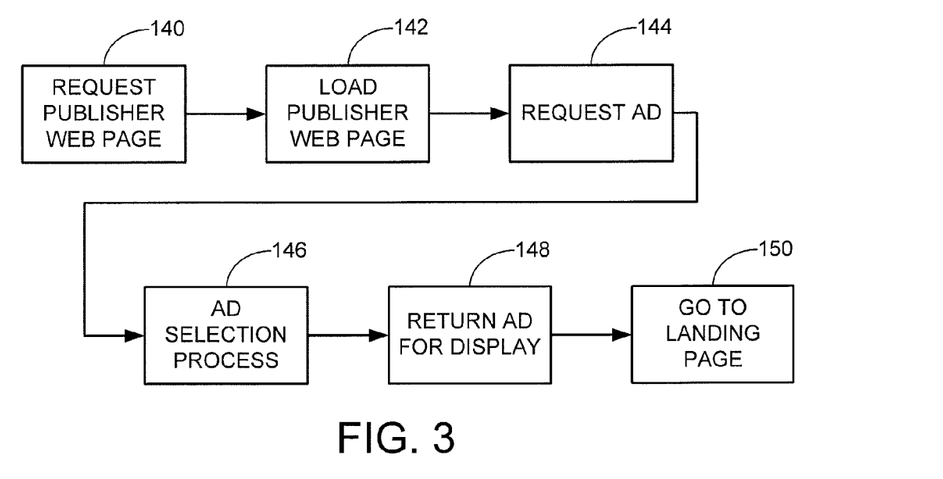
FIG. 3 illustrates an example manner in which a content item can be requested for display in a publisher display item using the system of FIGS. 1-2.

FIG. 3 illustrates a sequence of steps that can be carried out by the system of FIG. 2. At block 140, the device 108 requests a specific publisher web page from an associated publisher server 102. This may be initiated in a variety of ways, such as the user activating a web browser application on the smart phone and typing in a URL address associated with the requested page. The device 108 generally issues a request to the publisher server 102 for the selected web page, which is accessed and returned to the user device 108 for loading on the GUI 116 (block 142).

During the loading of the selected web page, a request for an ad may be issued from the device 108 to the ad server 104, as shown by block 144. An ad selection process is carried out at block 146 to select an appropriate ad (content item). Various aspects of the ad selection process will be discussed in detail below.

The selected ad is returned at block 148 for display on the user device 108. Upon user selection (a "click") of the ad, the device 108 is connected to an associated landing page at block 150. The loading of the landing page at block 150 is carried out in a manner similar to that discussed above in blocks 142, 144.

Figure 4:
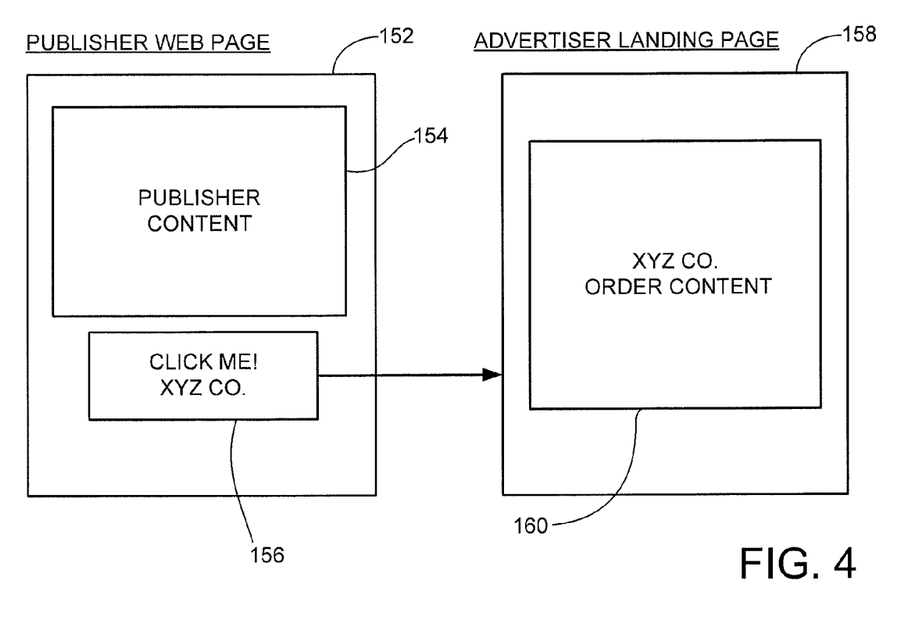
FIG. 4 illustrates selection (clicking) of a content item and its relationship to an associated landing page.

FIG. 4 illustrates the sequence of FIG. 3 in greater detail. An example publisher web page (publisher display item) 152 is loaded to and displayed on the device 108. The publisher web page 152 has publisher content 154 and an ad (content item) 156 for an advertiser "XYZ Co." User selection of the ad 156 results in the loading of an advertiser landing page 158 from the XYZ Co. advertiser server 106 with associated order content 160 associated with products, services or other information associated with XYZ Co.

While the foregoing approach is operable, it can be challenging to identify appropriate display items for the presentation of content items. In FIG. 4, automated or manual decision making may be required by the advertiser to select the publisher web page 152 for potential placement of its ad 156.

For example, the publisher content 154 on the web page 152 may include certain textual combinations that, when analyzed by the ad server 104 in relation to textual combinations associated with the ad 156 (or the advertiser XYZ Co. itself), provide a significant contextual relation between the ad 156 and the page 152, thereby making the web page 152 a good candidate for the ad 156.

Alternatively, the advertiser XYZ Co. may manually identify the web page 152 as a desired target for the placement of the ad 156 based on external empirical or a priori knowledge, market research, popularity of the web site, etc. However, if the page 152 was selected based on its popularity, advertising on the web page 152 may come at a premium, and ad impression and click opportunities of other, less popular sites may be overlooked.

More specifically, a second publisher web page (not separately shown in FIG. 4) may have publisher content that does not provide a similar measure of contextual relationship between the page and the ad, but would nevertheless be a good target for potential placement on the basis that users that request (and click ads on) page 152 also tend to have a relatively significant rate of requesting ads (e.g., click through rate, "CTR") from the second page.

The above approach further fails to account for ad placement opportunities that may be available in non-web page publisher display items, such as mobile apps, A/V works, etc. that are visited by the users of the web page 152 and which have significant CTR or other measures of usage characteristics.

Figure 5:
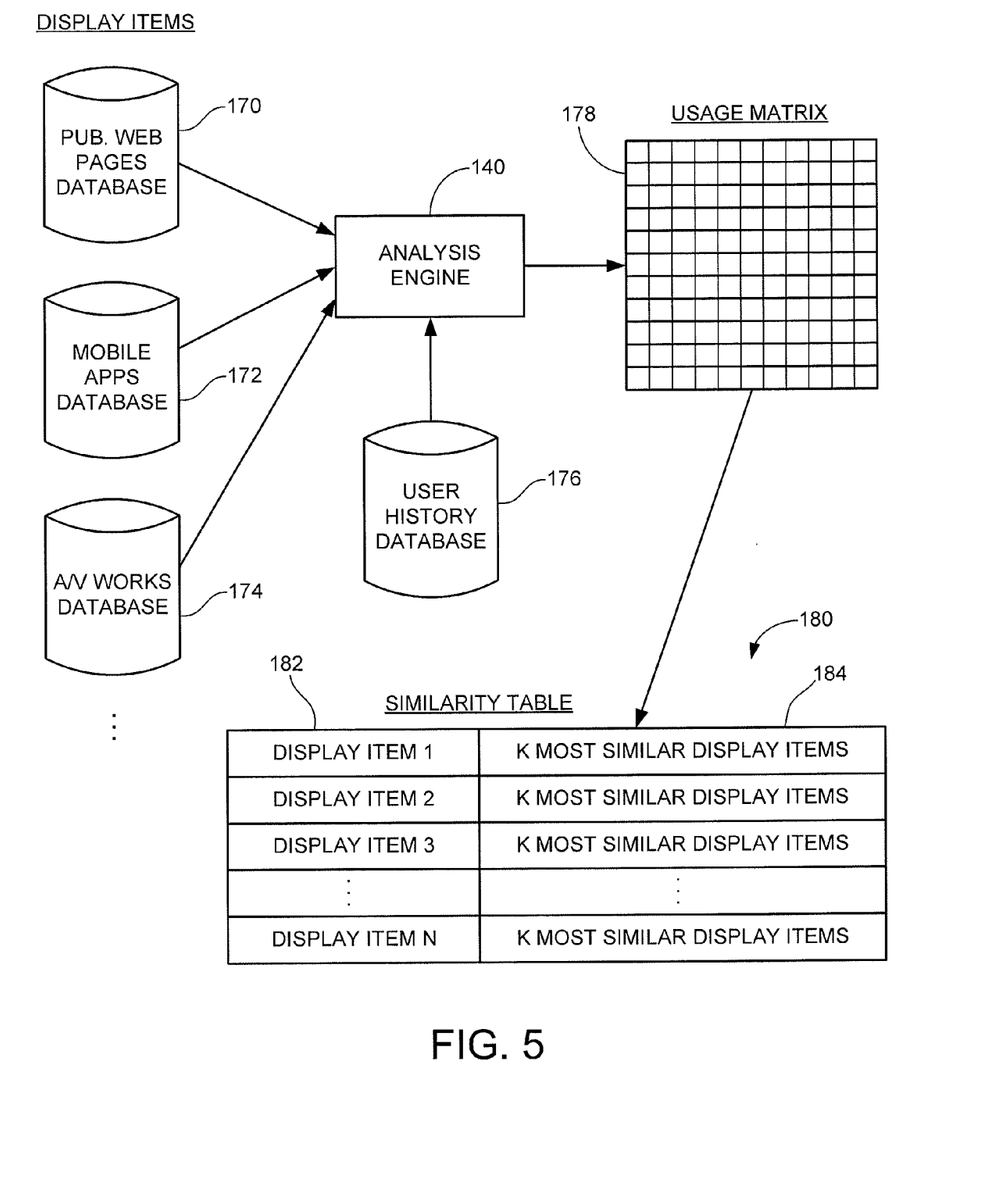
FIG. 5 is a functional block representation of an analysis engine operative in accordance with various embodiments to generate a similarity table of different types of publisher display items with similar usage characteristics.

Accordingly, FIG. 5 illustrates operation of the system 100 in accordance with various embodiments to identify such other ad (and more generally, other content item) placement opportunities. The system can facilitate advertisers (marketers) in developing campaigns to promote any number of physical and digital entities (e.g., websites, apps, videos, music, products, services, games, etc.). Generally, FIG. 5 shows an example operation of the analysis engine 140 of the ad server 104 from FIG. 2, although it will be appreciated that other arrangements can be used for the analysis.

Generally, the ad server 104 has access to impression and conversion data for the publisher display items serviced by the system. These data are used to extract concurrence information in terms of users and their interaction behavior regarding the selection of content items on various publisher displays.

From this a large data structure can be developed, such as in the form of a two dimensional matrix, with each row representing a different user and each column representing a content item that was selected by the user on the associated publisher display item. It should be noted that security and privacy protection mechanisms are incorporated into the system, and that no personally identifiable user information is used in this analysis.

The system next proceeds to compute a similarity measure (value) for each item through a well-known metric such as a Jaccard similarity measure. Thereafter, for each publisher display, the system can obtain a number K (e.g., 10, etc.) of the most similar display items in terms of usage characteristics. Thus, for or each publisher display item, a set of K most similar publisher display items for which users of the publisher display item also tend to actively visit (and interact with) can be identified.

Using this system, an advertiser can develop a marketing strategy (e.g., an ad campaign) that selects, for potential placement of a content item, a particular publisher display item as well as the K most similar publisher display items to the selected publisher display item in terms of similar usage characteristics. Suggested placements can be displayed by an ad server front end to an advertiser based on the selection of a particular publisher display item. Additionally or alternatively, the sets of similar display items can be incorporated as part of the automated ad (content item) selection process.

Referring again to FIG. 5, the analysis engine 140 may be configured to access a number of different databases for different types of publisher display items. Example databases shown in FIG. 5 include a publisher web pages database 170, a mobile apps database 172, an A/V database 174, etc. These databases may be in a single memory device or may be in a memory characterized as a distributed, discontinuous memory across various locations and maintained by different systems.

In some embodiments, the publisher web pages database 170 includes web pages such as the example page 152 in FIG. 4 serviced with ads by the ad server 104. The mobile apps database 172 includes various mobile apps and the associated user activity statistics. The A/V works database 174 may include a song download service, a video display service, an on-line store from which users download various digital entities, etc.

A user history database 176 is also represented in FIG. 5. This database may be a separate database or may incorporate data from the databases 170-174. In some embodiments, the engine identifies, such as on a per device basis, activity associated with that device 108 in relation to the respective databases. The device may be identified by a universal device identifier (UDID) or some other non-personally identifiable information. The users may be provided with an opportunity to control whether programs or features collect user information (e.g., information about a user's social network, social action or activities, profession, a user's preferences, or a user's current location), or to control whether and/or how to receive content from the content server that may be more relevant to the user. In addition, creation data may be treated in one or more ways before it is stored or used, so that no personally identifiable information is removed. For example, a user's identity may be treated so that no personally identifiable information can be determined for the user, or a user's geographic location may be generalized where location information is obtained (such as to a city, Zip code, or state level), so that a particular location of a user cannot be determined. Thus, the user may have control over how information is collected about the user and used by a content server.

In other embodiments, in the instance where the user consents to the use of information in the system, the information (e.g., an email address, etc.) may be used for the basis of the analysis. As before, no personally identifiable information is used or released by the system.

In situations in which the systems and/or methods discussed herein collect personal information about users, or may make use of personal information, the users may be provided with an opportunity to control whether programs or features collect user information (e.g., information about a user's social network, social action or activities, profession, a user's preferences, or a user's current location), or to control whether and/or how to receive content from the content server that may be more relevant to the user. In addition, creation data may be treated in one or more ways before it is stored or used, so that no personally identifiable information is removed. For example, a user's identity may be treated so that no personally identifiable information can be determined for the user, or a user's geographic location may be generalized where location information is obtained (such as to a city, Zip code, or state level), so that a particular location of a user cannot be determined. Thus, the user may have control over how information is collected about the user and used by a content server.

A matrix data structure is generally depicted at 178. While a variety of data structures can be formed, the matrix 178 can be arranged to depict, for each user device, associated activity for each of the population of available publisher display items. In some embodiments, the matrix may represent actions taken by the user, such as ad requests to the ad server for the display of ads, over some selected period of time (e.g., past X months, etc.).

A similarity measure is next calculated for each device-item pair. As noted above, one suitable similarity measure is the Jaccard similarity measure, which evaluates the similarity of two objects in terms of n binary attributes in order to arrive at a value that represents the overlap between the objects in relation to their shared attributes. Generally, the higher the similarity value, the more similar the respective objects. Similarity measures are well known to the skilled artisan and therefore the mathematical basis for such calculations will be omitted for brevity.

By evaluating the similarity of each publisher display item in turn to every other publisher display item using common device activity actions as the attributes, the aforedescribed similarity measurements can be generated, and the top K (e.g., 10) can be selected for each display item in turn.

Correlation patterns between different types of publisher display items can be readily identified. For example, the system of FIG. 5 may determine that a large percentage of users who download a particular mobile app A also tend to download mobile app B. Therefore, both mobile apps A and B may be good candidates for placement strategies involving a particular content item.

Using another example, users who click on ads from web page A may be found to also tend to download song B (or video C, or book D, or mobile app E, etc.). This information provides a number of cross-platform opportunities to reach the same or similar users based on actual usage.

FIG. 5 further shows a second data structure in the form of a similarity table 180 that tabulates the results of the similarity measure analysis. As before, any number of formats can be used. In FIG. 5, each display item 1 to N in the population is identified in a first field 182 and the K most similar display items are identified in a second field 184. This facilitates an efficient search and lookup mechanism.

Figure 6:
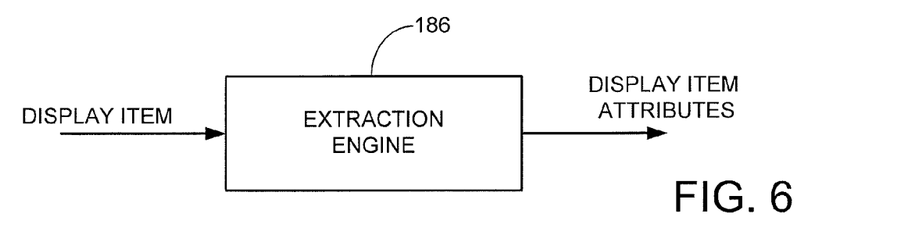
FIG. 6 represents an extraction engine which extracts attributes from the various display items of FIG. 5.
Figure 7:
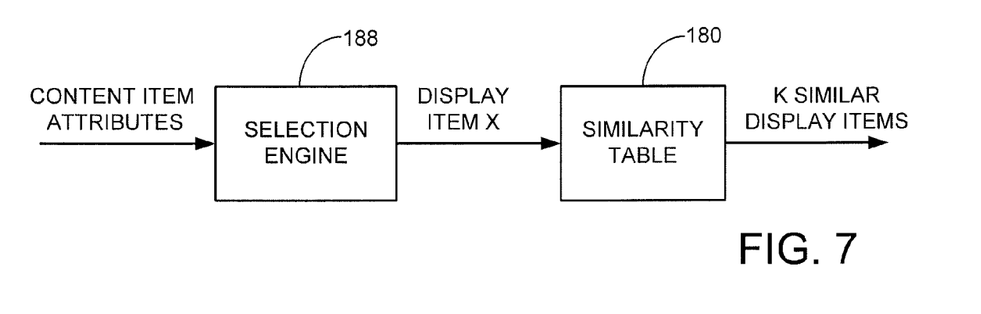
FIG. 7 shows selection of a particular publisher display item and the associated similar display items identified in FIG. 5 for a selected content item.

FIGS. 6 and 7 show additional operations that may be carried out as part of the present example, such as by the analysis engine 140 of FIG. 5, by some other part of the ad server 104, or by another module. An extraction engine 186 can be used to extract a list of attributes associated with a selected publisher display item.

The attributes may be in the form of contextual combinations extracted from the text of the display item, or from other information associated with the display item. Filtering and other signal analysis techniques may be applied to arrive at "important" terms (e.g., keywords, etc.) associated with the display item. Manual selection of such terms can also be applied. In some embodiments, a set of attributes are obtained for each of the display items in the similarity table 180, although such is not necessarily required. Although not specifically shown in FIG. 6, a similar operation can be carried out by the extraction engine 186 to obtain corresponding attributes for each of the content items (e.g., ads) in the system.

FIG. 7 illustrates a selection engine 188 that compares content item attributes with display item attributes to identify a particular display item X having significant contextual relation to the content item. The identified content item X can thereafter be used, via the similarity table 180, to identify the K most similar display items for potential placement of the input content item.

As noted above, the data analysis of FIG. 5 may be carried out on a time-basis. Different time intervals (buckets) may be used to provide an analysis over time of the different usage characteristics for the population of publisher display items. An advantage of this approach is graphically set forth by FIG. 8, which provides different usage curves 190, 192 and 194 plotted against an elapsed time x-axis 196 and a usage y-axis 198. The data from FIG. 8 can be obtained, for example, by performing the matrix analysis for different time intervals and accumulating total user population values for each display item.

Figure 8:
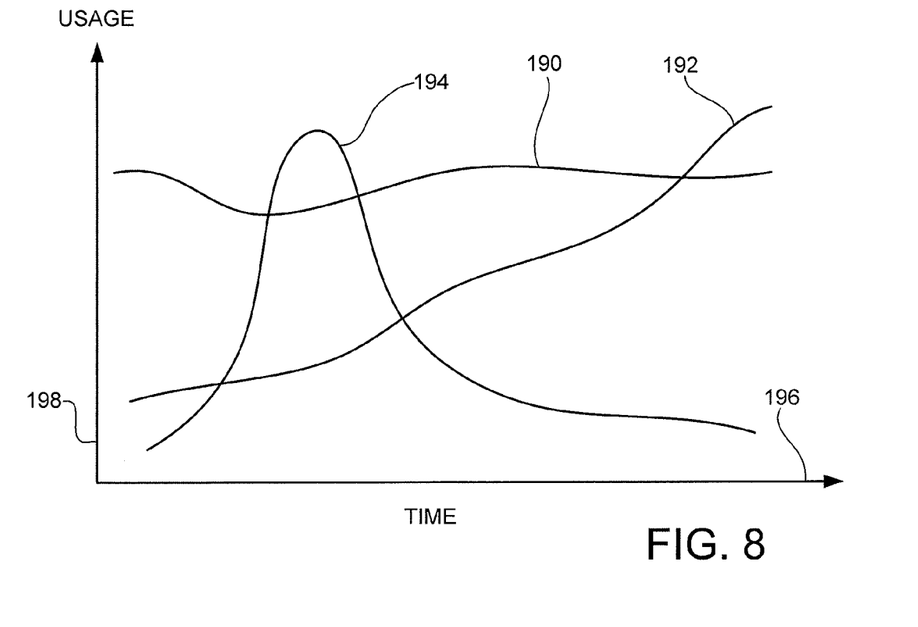
FIG. 8 graphically illustrates different usage characteristics over time for different types of publisher display items.

It is contemplated that the usage characteristics may be time dependent. Curve 190 represents steady-state usage (e.g., popularity) of a first publisher display item, which generally corresponds to largely constant, relatively high popularity (vis a vis user interaction) for a first display item. Without limitation, an example of this first display item may be a popular news or culture web page with loyal, steady readership.

Curve 192 shows an increasing trend for a second display item that is generally showing increased user activity over time. Without limitation, an example of this second display item may be a new e-book that is gaining in popularity and readership.

Curve 194 represents a generally bell-shaped curve for a third display item that peaked in popularity and is now experiencing a decrease in user interest. Without limitation, an example of this third display item may be a recent hit song or video that was popular for a short while and now users have moved on to other interests.

Information such as depicted by FIG. 8 can be displayed in graphical and/or tabulated form to provide further information regarding a given marketing strategy for a selected content item. That is, similarity as well as time-based variations in usage characteristics may be taken into account in selecting or rejecting potential placements.

Figure 9:
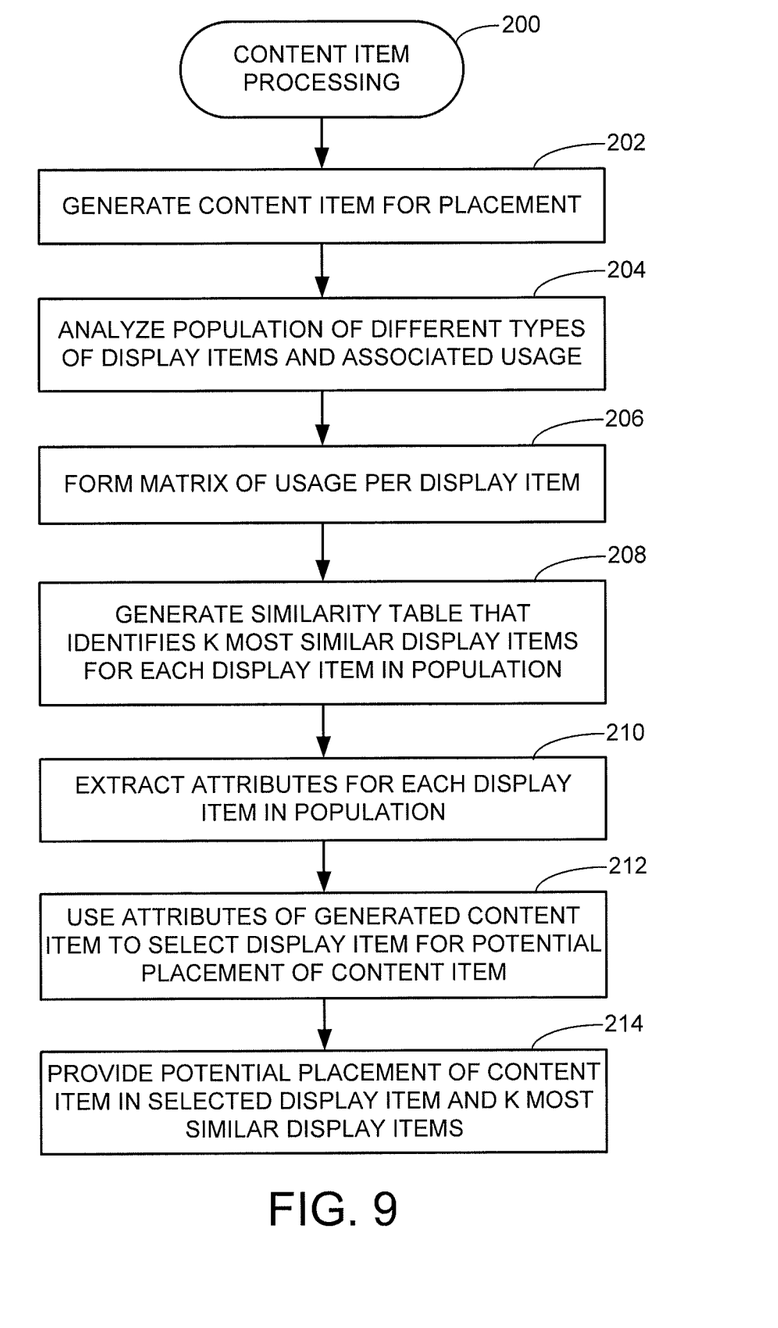
FIG. 9 is a flow chart for a CONTENT ITEM PROCESSING routine generally illustrative of steps carried out in accordance with some embodiments.

FIG. 9 sets forth a CONTENT ITEM PROCESSING routine 200 generally illustrative of steps that may be carried out in accordance with the foregoing discussion. A content item is generated at step 202 for placement in various publisher display items in an available population. This may include an ad such as the example ad 156 in FIG. 4, or some other content item.

Each of the publisher display items in said population are analyzed at step 204. It is contemplated that the population of display items will encompass a variety of different types of items (e.g., web pages, mobile apps, games, e-books, music displays, video displays, etc.), as discussed above in FIG. 5.

A matrix may be formed as shown by step 206 to arrive at usage characteristics for each of the different display items in the population. A similarity measure analysis is carried out at step 208 to generate a similarity table that is operative to identify a number K (such as 10) of the most similar display items for each display item in the population.

As desired, attributes are extracted for each display item in the population at step 210, as discussed above in FIG. 6. The extracted attributes are used in step 212 to identify a target display item suitable for placement of a selected content item, such as set forth in FIG. 7.

Potential placement of the selected content item is thereafter arranged in step 214 to include the publisher display item identified in step 212 as well as the K most similar display items set forth in the similarity table.

The set of display items (e.g., the display item from step 212 as well as the K most similar items from step 214) can thereafter be recommended to the owner of the selected content item for manual selection thereof. Additionally or alternatively, the set of display items can be incorporated into the ad selection process (block 146 in FIG. 3) so that the content item is considered in an ad auction or other automated selection process each time one of the set of display items requests an ad (or other content item).

In accordance with the foregoing discussion, it will be understood that the "display" of a publisher display item on a graphical user interface (GUI) can be in any user detectable form, including but not limiting to visual, audible or other sensory form. Reference to "different types" of display items will be understood consistent with the foregoing discussion to describe different classes of display items that provide different file format displays for a user (e.g., text, audio, video, still images, mobile apps, etc.).

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A computer implemented method comprising:
identifying a population of web sites and mobile applications based on a first content item served for display by each of the population of web sites and mobile applications, the mobile applications comprising applications other than web browsers;
receiving data from a plurality of network accessible devices displaying the first content item on one of the population of web sites and mobile applications, the data indicative of display of the first content item resulting in an impression;
calculating a first number of impressions of the first content item for a first web site from the received data;
calculating a respective number of impressions of the first content item for each mobile application of the population of web sites and mobile applications;
determining, by the computer, a set of the mobile applications, numbering fewer than a total number of mobile applications in the population of web sites and mobile applications, based on similarity to the first web site, by:
retrieving the first number of impressions of the first content item for the first web site;
for each respective mobile application of the population of web sites and mobile applications:
retrieving the respective number of impressions of the first content item for the respective mobile application of the population of web sites and mobile applications;
comparing the first number of impressions to the respective number of impressions for the respective mobile application to determine a similarity measure for the respective mobile application relative to the first web site; and
including the respective mobile application in the set of the mobile applications when one of (1) the respective mobile application is one of a predetermined number of mobile applications when ranked by the similarity measure or (2) a value of the similarity measure of the respective mobile application exceeds a designated threshold; and
identifying a second content item served for display to the first web site of the population of web sites and mobile applications; and
transmitting the second content item to a network accessible device running one of the set of mobile applications, the second content item displayed on the one of the set of mobile applications based on the determined similarity of the one of the set of mobile applications to the first web site.

2. The method of claim 1, in which the comparing the first number of impressions to the number of impressions for the respective mobile application is over a selected time interval.

3. The method of claim 1, further comprises determining, by the computer, a set of audio works or textual works based on similarity to the first web site, the similarity determined by: for each of an available audio works or textual works previously served the first content item, identifying a number of impressions of the first content item displayed with the display of the audio works or textual works, and comparing the first number of impressions to the number of impressions for each of the audio works or textual works, wherein the audio works or textual works make sponsored content item requests.

4. The method of claim 1, in which the second content item is an advertisement adapted for display in an ad slot, and the transmitting step further comprises receiving a request for an ad from the network accessible device running the one of the set of mobile applications.

5. The method of claim 1, in which the mobile applications of the population of web sites and mobile applications are arranged into a similarity table which lists, for each web site in the population, a plural number K of the most similar mobile applications in the population, and in which the similarity table is referenced to suggest potential placement opportunities for the second content item responsive to selection of the first web site.

6. The method of claim 1, in which multiple similarity measure numbers are obtained for each respective mobile application of the population of web sites and mobile applications over a succession of time intervals.

7. The method of claim 1, further comprising extracting a set of attributes for each of the web sites in the population of web sites and mobile applications, comparing the attributes of the web sites to attributes of the second content item to identify the first web site.

8. The method of claim 7, in which the mobile applications of the population of web sites and mobile applications are arranged into a similarity table which lists, for each web site in the population, a plural number K of the most similar mobile applications in the population, and in which the similarity table is referenced to identify those mobile applications most similar to the first web site.

9. An apparatus comprising:
one or more memories storing a list of a population of web sites and mobile applications based on a first content item served for display with each of the population of web sites and mobile applications;
the one or more memories further storing a second content item selected from a group of content items for display to a first web site of the list of the population of web sites and mobile applications;
one or more processors executing operations stored on the one or more memories to determine a set of the mobile applications, numbering fewer than a total number of mobile applications in the population, based on similarity to the first web site, by:
receiving data from a plurality of network accessible devices displaying the first content item on one of the population of web sites and mobile applications, the data indicative of interaction with the first content item resulting in a conversion;
calculating a first number of conversions of the first content item for a first web site from the received data;
calculating a respective number of conversions of the first content item for each mobile application of the population of web sites and mobile applications; and
determining the set of the mobile applications by:
retrieving the first number of conversions of the first content item for the first web site from the one or more memories;
for each respective mobile application of the population of web sites and mobile applications:
retrieving the respective number of conversions of the first content item for the respective mobile application of the population of web sites and mobile applications from the one or more memories, and
comparing the first number of conversions to the respective number of conversions for the respective mobile application relative to the first web site, the respective mobile application included in the set of the mobile applications if the respective mobile application is one of a predetermined number of highest ranked mobile applications when ranked by similarity; and
the one or more processors further executing operations stored on the one or more memories to transmit the second content item to a network accessible device running one of the set of mobile applications, the second content item displayed on the one of the set of mobile applications based on the determined similarity of the one of the set of mobile applications to the first web site.

10. The apparatus of claim 9, in which the similarity is further determined by determining a similarity measure number for each mobile application of the population of web sites and mobile applications and using the similarity measure numbers to determine the set of the mobile applications.

11. The apparatus of claim 9, in which the similarity is determined by comparing the first number of conversions to the number of conversions of each mobile application of the population of web sites and mobile applications over a selected time interval.

12. The apparatus of claim 9, in which the one or more processors further execute operations to determine a set of audio works or textual works based on similarity to the first web site, the similarity determined by: for each of an available audio works or textual works previously served the first content item, identifying a number of conversions of the first content item displayed with the display of the audio works or textual works, and comparing the first number of conversions to the number of conversions for each of the audio works or textual works, wherein the audio works or textual works make sponsored content item requests.

13. The apparatus of claim 9, in which the second content item is an advertisement (ad) adapted for display in an ad slot and the one or more processors further execute operations to receive a request for an ad from the network accessible device running the one of the set of mobile applications.

14. The apparatus of claim 9, in which the mobile applications of the population of mobile applications are arranged into a similarity table which lists, for each web site in the population of web sites and mobile applications, a plural number K of the most similar mobile applications in the population, and in which the similarity table is referenced to suggest potential placement opportunities for the second content item responsive to selection of the first web site.

15. The apparatus of claim 10, in which multiple similarity measure numbers are obtained for each mobile application of the population of web sites and mobile applications over a succession of time.

16. The apparatus of claim 9, wherein the one or more processors further execute operations to extract a set of attributes for each of the web sites in the population of web sites and mobile applications, compare the attributes of the web sites to attributes of the second content item to identify the first web site.

17. A computer implemented method comprising:
identifying a population of web sites and mobile applications based on a first content item served for display with each of the population of web sites and mobile applications;
receiving data from a plurality of network accessible devices displaying the first content item on one of the population of web sites and mobile applications, the data indicative of interaction with the first content item resulting in an impression or conversion;
calculating a first number of impressions or conversions of the first content item for a first mobile application from the received data;
calculating a respective number of impressions or conversions of the first content item for each web site of the population of web sites and mobile applications;
determining, by the computer, a set of the web sites, numbering fewer than a total number of web sites in the population of web sites and mobile applications, based on similarity to the first mobile application, the similarity determined by:
retrieving the first number of impressions or conversions of the first content item for the first mobile application;

for each respective web site of the population of web sites and mobile applications:
retrieving the respective number of impressions or conversions of the first content item for the respective web site of the population of web sites and mobile applications, and
comparing the first number of impressions or conversions to the respective number of impressions or conversions for the respective website relative to the first mobile application, the respective web site included in the set of the web sites if the similarity of the respective web site exceeds a designated threshold; and
identifying a second content item served for display to the first mobile application of the population of web sites and mobile applications; and
transmitting the second content item to a network accessible device displaying one of the set of web sites, the second content item displayed on the one of the set of web sites based on the determined similarity of the one of the set of web sites to the first mobile application.

18. The method of claim 17, in which the similarity is further determined by determining a similarity measure number for each web site of the population of web sites and mobile applications and using the similarity measure numbers to determine the set of the web sites.

19. The method of claim 18, in which the similarity is determined by comparing the first number of impressions or conversions to the number of impressions or conversions for each of the population of web sites and mobile applications over a selected time.

* * * * *